(12) United States Patent
Jiang et al.

(10) Patent No.: US 7,238,426 B2
(45) Date of Patent: Jul. 3, 2007

(54) COLUMN PACKING MATERIAL (75) Inventors: Wen Jiang, Umea (SE); Knut Irgum, Bullmark (SE)

(73) Assignee: Sequant AB, Umea (SE)

( * ) Notice: Subject to any disclaimer, the term of this patent is extended or adjusted under 35 U.S.C. 154(b) by 0 days.

(21) Appl. No.: 10/710,937

(22) Filed: Aug. 13, 2004

(65) Prior Publication Data
US 2005/0064192 A1   Mar. 24, 2005

Related U.S. Application Data (60) Provisional application No. 60/481,224, filed on Aug. 13, 2003.

(51) Int. Cl.
*B05D 3/02* (2006.01)
*B32B 5/16* (2006.01)
*B05D 7/00* (2006.01)

(52) U.S. Cl. ............ 428/407; 427/221; 427/302; 427/314

(58) Field of Classification Search .......... 428/403, 428/407; 427/221, 302, 314, 487
See application file for complete search history.

(56) References Cited

U.S. PATENT DOCUMENTS

| | | | | |
|---|---|---|---|---|
| 5,476,660 A | * | 12/1995 | Somasundaran et al. | 424/401 |
| 5,589,069 A | * | 12/1996 | Wenzhi | 210/635 |
| 5,645,883 A | * | 7/1997 | Russell et al. | 427/2.25 |
| 6,866,793 B2 | * | 3/2005 | Singh | 252/79.1 |
| 6,884,345 B1 | * | 4/2005 | Irgum et al. | 210/198.2 |
| 2003/0168627 A1 | * | 9/2003 | Singh et al. | 252/79.1 |

OTHER PUBLICATIONS

Yu et al., "The Synthesis and Characterization of Chemically Bonded Silica-Based Zwitterion-Exchangers for HPLC", Journal of Chromatographic Science, vol. 24, May 1986, 177-182.*
Arasawa et al., "Grafting of zwitterion-type polymers onto silica gel surface and their properties", Reactive and Functional Polmers 61 (2004) 153-161.*

* cited by examiner

*Primary Examiner*—H. Thi Le
(74) *Attorney, Agent, or Firm*—Nixon & Vanderhye P.C.

(57) ABSTRACT

A porous silica particle suitable can be used in zwitterionic high performance liquid chromatography. The particle comprises covalently bound zwitterionic groups grafted through a polymerization reaction. A hydrophilic column packing material suitable for use as a stationary phase in zwitterionic high performance liquid chromatography may comprise porous silica particles. The particles may comprise covalently bound zwitterionic groups. Methods for manufacturing and applying the silica particles exist.

12 Claims, 6 Drawing Sheets

COLUMN PACKING MATERIAL

CROSS REFERENCE TO RELATED APPLICATIONS

This application claims the benefit of U.S. Provisional Patent Application Ser. No. 60/481,224, filed Aug. 13, 2003, the entire disclosure of which is hereby incorporated by reference.

BACKGROUND OF INVENTION

Field of the Invention

The present invention relates to a porous silica particle suitable for being used in zwitterionic high performance liquid chromatography or for separation of hydrophilic compounds, as well as a column packing material comprising such particles. Furthermore, the present invention also provides processes for manufacturing the column packing material.

An ideal zwitterionic stationary phase is characterized by having ionic moieties containing both positive and negative charges in an exact balance and within the same molecule. Consequently, although the surface density of charged moieties is high, the material ideally has no significant net charge and is thus for example capable of accomplishing simultaneous separation of cations and anions and due to its highly hydrophilic character also suitable as support material for hydrophilic interaction liquid chromatography (HILIC)(Alpert, A. J., J. Chromatogr. 1990, 499, 177–96). In HILIC a hydrophilic stationary phase retains polar and hydrophilic analytes in a mobile phase environment containing a high ratio of a water-soluble organic solvent, usually acetonitrile, and a low ratio of water or a buffer. The HILIC technique bears similarities to straight phase chromatography, with respect to the stationary phase, and to reversed phase chromatography, with respect to the mobile phase, but stands out as a relatively new tool for the analysts. The zwitterionic stationary phase in liquid chromatography has attracted more interest in recent years and has also been reviewed (Nesterenko, P. N.; Haddad, P. R. Anal. Sci. 2000, 16, 565–574, Hu W.; Haddad, P. R. Trends Anal. Chem. 1998, 17, 73–79). A prerequisite for high performance liquid chromatography (HPLC) is that the stationary phase is stable and that the performance does not degrade due to sample injections or the use of the required solvents. Stability is also important to avoid phase bleed that eventually may interfere with the detection and contamine the eluting components. That makes covalently bonded phases the preferred alternative for HPLC.

A commonly used approach for preparation of bonded silica phases is to use the silane corresponding to the desired functionality. In an alternative way for application in reversed phase and ion-exchange chromatography propylamine bonded silica,
1-(dimethylchlorosilyl)-2-m,p-chloromethylphenyl ethane derivatised silica and glycidoxypropyltrimethoxy silane derivatised silica were used as substrates for the preparation of bonded zwitterionic phases in a stepwise fashion finally requiring toxic methylating agents like methyl iodide for quaternization into a strong anion exchange group within the zwitterionic functionality (Yu, L. W. ; Hartwick, R. A. J. Chromatogr. Sci. 1989, 27, 176–185.). Glycidoxypropyltrimethoxysilane derivatised silica was also the starting material for the bonding of amino acids creating a zwitterionic functionality consisting of weak positively and negatively ion-exchange groups (Nesterenko, P. N., Elefterov A. I., Tarasenko D. A., Shpigun O. A., J. Chrom., 1995, 706, 59–68). The approach of using a stepwise synthesis were also utilized by modification of a commercially available N,Nsilane column with n-polysulfone (Tramposch W. G., Weber S. G., J. Chrom., 1990, 344, 113–23) for straight phase chromatography, and an N-(2-aminoethyl)-3-aminopropyltrimethylmetoxysilane modified silica was reacted to become a weak anion and a strong cation zwitterionic phase (Chou, T. Y.; Yang, M. H. J. Liq. Chromatogr. Rel. Technol. 1996, 19, 2985–2996.). It is questionable if a charge balance was achieved making these latter materials truly zwitterionic due to the presence of an amino group introduced with the silane or presence of underivatized amines that would have required "end-capping" by a complete and stoichiometric functionalisation reaction. In order to take advantage of the favourable chromatographic properties of silica and to improve the hydrolytic stability of this material a polystyrene-coated silica was prepared and subsequently in a stepwise way sulphonated and aminated in an attempt to prepare a zwitterionic column support material (Kurganov A. A., Davankov V. A., Unger K. K., J. Chrom., 1991, 548, 207–14). Stepwise derivatization routes were also utilized on polymeric particle supports (Jiang, W.; Irgum, K. Anal. Chem., 1999, 71, 333–344; Jiang, W.; Irgum, K. Anal. Chem., 2001, 73, 1993–2003.) and difficulties to obtain charge balance was proved by elemental analysis determinations. A one-step reaction grafting of zwitterionic functional groups onto an irradiation activated polymeric membrane support was suggested but not shown by Brueschke H. E. A., et al in U.S. Pat. No. 5,164,424. This was later utilized in the functionalisation of a polymeric monolithic column support by potassium peroxodisulfate initiated polymerization of the vinylic zwitterion 3N,N-dimethyl-N-(methacryloyloxyethyl)ammonium] propanesulfonate onto the polymeric backbone (Viklund C., Irgum K., Macromolecules, 2000, 33, 2539–44).

The zwitterionic functionality on the stationary phase makes it hydrophilic, like a cation exchanger or an anion exchanger, without having a net charge. The hydrophilic character and the ability to exhibit weak electrostatic interactions of the phase are properties that may be advantageous in chromatographic modes where a hydrophilic phase is preferred. It can therefore be expected to be suitable for HILIC.

Four different synthesis routes to produce covalently bonded zwitterionic polymeric stationary phases with variable charge balance have been described (Jiang, W.; Irgum, K. Anal. Chem., 1999, 71, 333–344; Jiang, W. ; Irgum, K. Anal. Chem., 2001, 73, 1993–2003.). These materials can accomplish the separation of inorganic anions and cations, independently and simultaneously, by using solutions of perchloric acid and perchlorate salt as mobile phases. It was found that minor differences in charge balance affect the separation profiles of inorganic ions, and although the separation properof all these sorbents are mainly characteristic of zwitterionic materials, there is still a need in the art to develop a synthesis technique that will produce a silica material with a more exact charge balance.

SUMMARY OF INVENTION

The grafting procedure is theoretically better suited for the synthesis of zwitterionic stationary phases with good charge balance, because the material results from a monomer with an exact charge balance. In the present invention, a zwitterionic stationary phase designated KS-TC-TBHP-SPE has been synthesized by grafting 3N,N-dimethyl-N-(methacryloyloxyethyl)ammonium] propanesulfonate (SPE) onto porous spherical silica, using tert-butyl hydroperoxide (TBHP) attached to a thionyl chloride (TC) activated Kromasil silica (KS) surface to induce the polymerization. This procedure causes the polymerization grafting to start from the particle surface. In a similar experiment the vinylic zwitterionic monomer 1-(3-sulfopropyl)-2-vinylpyridinium betaine (SPV) was used to prepare a stationary phase designated KS-TC-TBHP-SPV. The charge balance between quaternary and sulfonic groups in the graft layer was determined by elemental analysis and the procedure was found to result in equivalent stoichiometry for nitrogen and sulfur corresponding to the strong anion-exchanger and strong cation-exchanger group within the the monomeric units. A zwitterionic stationary phase designated KS-DIOL-SPE and KS-SPE has also been synthesized by direct polymerization grafting of SPE, using cerium ammonium nitrate as initiator, onto diol activated and native porous spherical silica. These materials show similar characteristics. The chromatographic evaluation involved packing the material into a column, on which small inorganic ions, proteins and hydrophilic compounds were successfully separated.

Accordingly, in a first aspect, the present invention provides a porous silica particle suitable for being used in zwitterionic high performance liquid chromatography and hydrophilic interaction liquid chromatography. This particle comprises covalently bound zwitterionic groups. Typically, the particles of the invention have particle sizes from 0.2 to 100 µm and in particular from 3 to 60 µm. Typically, the particle of the invention has a pore size from 10 to 1000 Å, and in particular from 60 to 400 Å.

Preferably, the zwitterionic groups comprise both quaternary ammonium groups and sulfonate groups.

In a preferred embodiment, the zwitterionic groups have been grafted on the particle. In a more preferred embodiment, more zwitterionic groups have been polymerized to the zwitterionic groups that have been grafted on the particle. Accordingly, polymeric chains of zwitterionic monomers form the zwitterionic groups of this embodiment.

Preferably, the vinylic zwitterionic monomer is a zwitterionic methacryloxyethyl monomer, such as a A-[N-(C 1–C4)-alkyl-N-(C 1–C4)-alkyl-N-methacryloyloxyethyl) ammonium]-(C1–C10)-alkylsulfonate, where A is an integer from 1 to 10. More preferably, the zwitterionic monomer is 3-[N,N-dimethyl-N-(methacryloyloxyethyl)ammonium] propanesulfonate, 1-(3-sulfopropyl)-2-vinylpyridinium betaine, or 3-[N,N-dimethyl-N-(methacrylamidopropyl)ammonium] propanesulfonate.

In a second aspect, the present invention provides a column packing material suitable for use as a stationary phase in zwitterionic high performance liquid chromatography and hydrophilic interaction liquid chromatography, the column packing material comprising porous silica particles, the particles comprising covalently bound zwitterionic groups. Typically, the particles of the column packing material have particle sizes from 0.2 to 100 µm and in particular from 3 to 60 µm. Typically, the particles of the column packing material have a pore size from 10 to 1000 Å, and in particular from 60 to 400 Å.

Preferably, the zwitterionic groups comprise both quatenary ammonium groups and sulfonate groups.

In a preferred embodiment, the zwitterionic groups have been grafted on the particles of the column packing material.

In a more preferred embodiment, more zwitterionic groups have been polymerized to the zwitterionic groups that have been grafted on the particles. Accordingly, polymeric chains of zwitterionic monomers form the zwitterionic groups of this embodiment.

Preferably, the zwitterionic monomer is a zwitterionic methacryloxyethyl monomer, such as a A-[N-(C 1–C4)-alkyl-N-(C 1–C4)-alkyl-N-methacryloyloxyethyl)ammonium]-(C1–C10)-alkylsulfonate, where A is an integer from 1 to 10. More preferably, the zwitterionic monomer is 3-[N,N-dimethyl-N-(methacryloyloxyethyl)ammonium] propanesulfonate, 1-(3-sulfopropyl)-2-vinylpyridinium betaine, or 3-[N,N-dimethyl-N-(methacrylamidopropyl)ammonium] propanesulfonate.

In a third aspect, the present invention provides a method for producing porous silica particles suitable for use in zwitterionic high performance liquid chromatography and hydrophilic interaction liquid chromatography, the particle comprising covalently bound zwitterionic groups. The method comprises the steps of: providing porous silica particles suitable for use in zwitterionic high performance liquid chromatography; reacting the silica particles with thionyl chloride, thereby obtaining activated silica particles; reacting the activated silica particles with a tert-(C4–C10)-alkyl hydroperoxide, thereby coupling the tert-C4–C10)-alkyl hydroperoxide to the activated silica particles, thereby obtaining peroxide-functionalized silica particles; and adding a zwitterionic methacryloxyethyl monomer to the peroxide-functionalized silica particles, thereby initiating graft polymerization of the zwitterionic methacryloxyethyl monomer to the peroxide-functionalized silica particles.

Any tertiary alkyl hydroperoxide comprising 4–10 carbon atoms can be used in the method. However, it is preferred to use tert-butyl hydroperoxide.

Preferably, the zwitterionic monomer is a zwitterionic methacryloxyethyl monomer, such as a A-[N-(C 1–C4)-alkyl-N-(C 1–C4)-alkyl-N-methacryloyloxyethyl)ammonium]-(C1–C10)-alkylsulfonate, where A is an integer from 1 to 10. More preferably, the zwitterionic monomer is 3-[N,N-dimethyl-N-(methacryloyloxyethyl)ammonium] propanesulfonate, 1-(3-sulfopropyl)-2-vinylpyridinium betaine, or 3-[N,N-dimethyl-N-(methacrylamidopropyl)ammonium] propanesulfonate.

In a fourth aspect, the present invention also provides a method for producing porous silica particles suitable for being used in zwitterionic high performance liquid chromatography and hydrophilic interaction liquid chromatography, the particle comprising covalently bound zwitterionic groups. The method comprises the steps of: providing porous silica particles suitable for use in zwitterionic high performance liquid chromatography and hydrophilic interaction liquid chromatography; suspending the silica particles in an aqueous solution of a zwitterionic methacryloxyethyl monomer, thereby obtaining a suspension of silica particles, and allowing the suspension to equilibrate at room temperature; heating the equilibrated suspension to 40 70° C. followed by addition of an aqueous solution of the initiator ammonium cerium nitrate, thereby initiating polymerization. The temperature that the equilibrated temperature is heated to may be any temperature between 40° C. and 70° C., inclusive, such as 40° C., 45° C., 50° C., 55° C., 60° C., 65° C., and 70° C.

Preferably, the zwitterionic monomer is a zwitterionic methacryloxyethyl monomer, such as a A-[N-(C1–C4)-alkyl-N-(C1–C4)-alkyl-N-methacryloyloxyethyl)ammonium]-(C1–C10)-alkylsulfonate, where A is an integer from 1 to 10. More preferably, the zwitterionic monomer is
3-[N, N-dimethyl-N-(methacryloyloxyethyl)ammonium] propanesulfonate, 1-(3-sulfopropyl)-2-vinylpyridinium betaine, or
3-[N,N-dimethyl-N-(methacrylamidopropyl)ammonium] propanesulfonate.

DETAILED DESCRIPTION

While the present invention has been described with specificity in accordance with certain of its preferred embodiments, the following examples serve only to illustrate the invention and are not intended to limit the same. If sources are not specifically described, materials are known and commercially available.

Reagents and chemicals used in the preparation of the invention were obtained as follows. Kromasil spherical silica particles (10 μm particle size with 200 Å pore size) were obtained from EKA Chemicals (Bohus, Sweden). The zwitterionic monomers
3-[N,N-dimethyl-N-(methacryloyloxyethyl)ammonium] propanesulfonate (SPE) [3637-26-1],
1-(3-sulfopropyl)-2-vinylpyridinium betaine (SPV) were obtained from Raschig Chemie (Ludwigshafen, Germany), while tert-butyl hydroperoxide (5 M in octane) was purchased from Aldrich (Steinheim, Germany). The zwitterionic amphiphile used for comparative ζ-potential measurein combinawith Nucleosil C$_{18}$ (3 μm; 120 Å Macherey-Nagel, Düren, Germany) was N-doN,N-dimethyl-3-ammonio-1-propanesulfonate (SB12; Aldrich). Thionyl chloride (99was obtained from Fluka (Buchs, Switzerland) and methanol (HPLC grade) was from J. T. Baker (Deventeer, Holland). Perchloric acid (70 p.a.) was from Riedel de Haën (Seelze, Germany). Acetone (purum) for washing was from Svenda AB (Stockholm, Sweden), and chloroform (p.a.) from Prolabo (Fontenay S/Bois, France). Water was purified by a Milli-Q water purification system (Millipore, Bedford, Mass.). The salts sodium sulfate, sodium chloride, sodium bromide, sodium tio-cyanate, sodium nitrate, sodium iodide, sodium perchlorate and ammonium acetate were of analytical grade and purchased form Merck (Darmstadt, Germany). Magnesium perchlorate (99%) and calcium perchlorate (99%) were from Aldrich, as was ammonium cerium nitrate (99.99%). Stock solutions of salts for injection were prepared by dissolving the salts directly in Milli-Q water. Analytical grade N-acetyl-5-methoxytryptamine (melatonin), 2,4-dihydroxypyrimidine (uracil), and 4-amino-2-hydroxypyrimidine (cytosine) were from Aldrich. Proteins used as test solutes were purchased from Sigma (St. Louis, Mo.), and were the following (CAS number; Sigma product number): Ovalbumin from chicken egg (9006-59-1; A5503); conalbumin from chicken egg (1391-06-6; C7786); α-chymotrypsinogen A Type II, from bovine pancreas (9035-75-0; C4879); cytochrome c, from horse heart (9007-43-6; C7752); lysozyme, from chicken egg white (12650-88-3; L6876). All purchased proteins were stored according to the manufacturer's recommendations and used as received to prepare solutions for injection by dissolution in water.

EXAMPLE 1

Synthesis and Characterization of the KS-TC-TBHP-SPE Zwitterionic Stationary Phase.

A 5 gram aliquot of Kromasil silica particles was dried at 110° C for 8 hours under vacuum. The dried silica was then transferred to a mixture of 75 ml chloroform and 75 ml thionyl chloride, and refluxed for 18 hours under slow stirring. The suspension was then allowed to cool to room temperature, filtered on a glass filter, and washed with large amounts of methanol and acetone. The collected activated silica particles were then transferred to a 100 ml E-flask, charged with 70 ml 1,4-dioxan, 20 ml tert-butyl hydroperoxide solution, and 0.25 g of solid sodium bicarbonate. The flask was covered with aluminum foil and reacted on a shaker at room temperature for 18 hours. The peroxidated particles were washed with methanol and dried at room temperature under vacuum.

Figure 7:
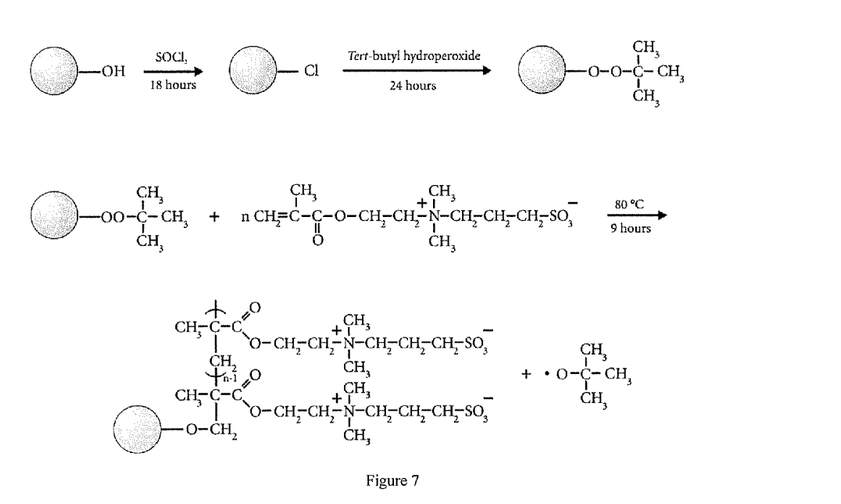
FIG. 7 shows a scheme of synthesis steps used for preparing the zwitterionic stationary phase KS-TC-TBH P-SPE.

Two grams of the peroxide functionalized silica were filled in a 100 ml three neck round bottom flask. To this flask was charged 60 ml water, 15 ml methanol, and 10 grams of SPE zwitterionic monomer. The mixture was thereafter degassed with nitrogen gas for 30 minutes. The graft polymerization was carried out at 80° C. for 9 hours with slow stirring under nitrogen. Finally, the polymerization suspension was mixed with ≈250 mL of 1M aqueous sodium chloride and ultrasonicated for 5 minutes, whereafter the particles were allowed to settle and the solution decanted. Resuspension in aqueous NaCl was repeated several times, followed by careful washing with water, filtering, and drying in air. The scheprocedure for the synthesis of the grafted KS-TC-TBHP-SPE material is shown in the scheme presented in FIG. 7. The sulfur and nitrogen contents of the intermediates and the final material were deterby elemental analysis by MikroKemi AB (Uppsala, Sweden) using validated methods.

The ζ-potentials were measured by photon correlation spectroscopy using a Malvern (Malvern, U.K.) Zetasizer 4 instrument. Stock samples were prepared by suspending 50 mg material in 30 ml of water. These stock samples were resuspended prior to each determination and the final samples were prepared by mixing 1 mL stock sample with buffer and/or salt at the appropriate concentration, and then diluted with water if necessary. The final volume was 6 mL in the experiments presented in Table 2 (See below) and 10 mL for the experiments in Table 3 (See below). After a solution was made up, it was thoroughly mixed on a Heidolph (Schwabach, Germany) REAX Control vortex mixer and immediately thereafter transferred to the measurement cell. The dynamically coating procedure performed as reference on Nucleosil $C_{18}$ took place by suspending a 50 mg aliquot in 30 mL water, to which had been added 100 mg of SB12. The suspension was thereafter treated in a Branson (Danbury, Conn.) model 3510 ultrasonic bath for 30 minutes and shortly thereafter subjected to the ζ-potential determination. The sample was treated as described above and no attempts were made to remove the unadsorbed SB12 from the coating solution. Reported ζ-potential values are mean±standard deviation for three repeated measurements on the same sample, made in rapid succession.

The column back-pressures were measured at room temperature (22±° C.) with the built-in digital pressure indicator of a Spectra-Physics (Mountain View, Calif.) model SP8700XR HPLC pump. After each change of solution, the column was equilibrated at a flow rate of 1.00 mL/min until the back-pressure remained stable within ±2 psi (<±0.4 of the absolute pressure) over 10 minutes, whereafter the readout value was recorded. The pressure indicator was not calibrated, but the linearity of the pump delivery rate/readout system vs. the programmed flow rate was ascertained by plotting the readout as function of five set flow rates over the interval 0–1 mL/min, whereby a linear, zero-crossing function was obtained.

The silica particles were first dehydrated with thionyl chloride to obtain silicone chloride reactive groups, followed by a reaction with tert-butylhydroperoxide to attach the peroxide groups. Finally, the grafting polymerization was started from a suspension of the modified particles in SPE. The reason for this method was to ascertain that the initiating groups were covalently bonded to the surface of the matrix particles. Therefore, free radical polymerization initiation sites will be created on the surface when the particles are heated to trigger the thermally initiated polymerization. Although a correspondamount of tert-butoxy free radicals will be released into the solution by cleavage of the surface-bound initiator groups, the concentration in solution will be considerably lower compared to the radical concentration used for grafting initiated by a solution-phase free radical source. Tsubokawa and Ishida developed this chemistry for the surface modification of ultrafine silica (Tsubokawa, N; Ishida, H. J. Polym. Sci. A: Poly. Chem. 1992, 30, 2241–2246.), and apparently it is suitable way of preparing brush type sorbents for chromatographic purposes through surface-initiated grafting.

TABLE 1

Elemental Analysis of Silica Before and After Grafting with Zwitterionic Brushes.

| Material | % $N_{E.A.}$[a] | % $S_{E.A.}$[a] | % $S_{Cal.}$[b] | % $S_{E.A.}$ : % $S_{Cal.}$[c] |
|---|---|---|---|---|
| Activated for grafting[d] | 0.16 | <0.20[e] | N/A[f] | N/A |
| Repeted experiment (n = 3) | 0.03 | <0.1 | N/A[f] | N/A |
| KS-TC-TBHP-SPE | 1.07 | 2.47 | 2.45 | 1.01 |
| Repeted experiment (n = 3) | 1.04 | 2.33 | 2.38 | 0.98 |
| KS-SPE (n = 3) | 1.0 | 2.2 | 2.29 | 0.96 |

[a]Percent N and S determined from elemental analysis;
[b]Stoichiometric % S calculated from $N_{E.A.}$ according to the molar weight ratio of 32.06:14.01;
[c]Amount of S incorporated in relation to the stoichiometric ratio;
[d]Particles with peroxide groups that were prepared for the final grafting step;
[e]The sulfur contents was below the detection limit;
[f]N/A, not applicable.

According to the elemental analysis result in Table 1, the molar ratio of nitrogen to sulfur was 1:1.01. In an initial measurment the blank values was unexpected high so repeated experiments were performed showing the experimental variation seen for the blank material and confirming the molar ratio of nitrogen to sulfur (0.98). This means that the grafted zwitterionic material had an exact charge balance enabled by the one step introduction of the zwitterionic vinyl monomer. The surface charge properties were then studied by particle electrophoresis in a Zetasizer photon correlation spectrometer, where the ζ-potentials for the particles were measured in 10 aqueous phosphate buffer at four different pH levels, with or without the addition of sodium chloride and sodium perchlorate. The results of these measurements are presented in Table 2, showing insignificant changes in ζ-potential as a function of pH with buffer only, and with sodium chloride added to the buffer.

TABLE 2

Results from the ζ-Potential Measurements on the Material KS-TC-TBHP-SPE.

| | Phosphate Buffer | | 10 mM Phosphate buffer + NaCl | | | 10 mM Phosphate buffer + NaClO$_4$ | | |
|---|---|---|---|---|---|---|---|---|
| pH | 10 mM | 90 mM | 2 mM | 20 mM | 80 mM | 2 mM | 20 mM | 80 mM |
| 5.0 | −8.6 ± 4.1 | −8.9 ± 0.6 | −11.3 ± 0.9 | −10.2 ± 0.8 | −9.1 ± 0.7 | −13.4 ± 3.9 | −16.1 ± 1.5 | −20.4 ± 3.2 |
| 6.0 | −13.1 ± 1.4 | −9.9 ± 0.4 | −12.4 ± 1.2 | −13.0 ± 0.8 | −9.0 ± 0.7 | −11.3 ± 0.8 | −15.7 ± 1.7 | −20.5 ± 0.4 |
| 7.0 | −14.7 ± 1.0 | −10.7 ± 0.6 | −15.8 ± 1.1 | −12.2 ± 0.8 | −9.5 ± 1.1 | −12.2 ± 0.3 | −16.4 ± 0.1 | −22.3 ± 0.6 |
| 8.0 | −12.8 ± 0.8 | −12.6 ± 0.7 | −13.1 ± 0.4 | −12.7 ± 0.6 | −12.2 ± 0.7 | −11.7 ± 1.1 | −14.9 ± 1.8 | −20.9 ± 1.6 |

However, the addition of perchlorate ions to the buffer caused a decrease in the ζ-potentials, which became increasingly negative as the perchlorate concentration was increased. This trend was evident at all the pH levels tested. This induction of a more negative surface charge is in accordance with the effects of perchlorate that have been observed earlier (Jiang, W.; Irgum, K. Anal. Chem., 1999, 71, 333–344; Jiang, W. ; Irgum, K. Anal. Chem., 2001, 73, 1993–2003., Viklund, C.; Irgum, K. Macro-molecules 2000, 33, 2539–2544; Viklund, C. ; Irgum, K. Anal. Chem., 2001, 73, 444–452., Iso, K.; Okada, T. Langmuir 2000, 16, 9199–9204., Cook, H. A.; Hu, W. Z. ; Fritz, J. S. ; Haddad, P. R. Anal. Chem. 2001, 73, 3022–3027.). Attempts were also made to measure the ζ-potentials in water, but the values obtained were not stable. The measurements were also difficult at the lowest salt concentration. The slurry had to be prepared immediately prior to filling the measurement cell, and the measurements had to be conducted rapidly because of aggregation and settling of the particles. It should be kept in mind that SPE homopolymer has an "antipolyelectrolytic" behavior in aqueous solution (Monroy Soto, V. M. ; Galin, J. C. Polymer 1984, 25, 254–262.; Schulz, D. N. ; Peiffer, D. G. ; Agarwal, P. K.; Larabee, J. ; Kaladas, J. J. ; Soni, L. ; Handwerker, B.; Garner, R. T. Polymer 1986, 27, 1734–1742.), i.e., the solubility of the linear zwitterionic polymer increases with increasing salt concentration, a salt-dependent solubility relationship that is opposite to conventional polyelectrolytes. The tendency of the particles to aggregate at low ionic strength and their failure to disperse in pure water therefore reveal the brush nature of the grafted layer. The presence of a grafted layer is further verified by the salt-dependent back-pressure of the column (Table 3).

TABLE 3

Back-pressure for the KS-TC-TBHP-SPE column with different acids and salts.

| | Change in back-pressure relative to water | | | | | |
|---|---|---|---|---|---|---|
| Concentration | HCl | HNO$_3$ | HClO$_4$ | NaCl | NaNO$_3$ | NaClO$_4$ |
| 2 mM | −2% | −2% | 1% | 3% | 4% | 4% |
| 20 mM | −1% | −1% | 23% | 3% | 4% | 24% |

When operated in pure water or with NaCl, NaNO$_3$ and 2 mM HClO$_4$, the back-pressure was ≈3,750 kPa. When 20 mM perchloric acid or sodium perchlorate was pumped, the back-pressure rose to ≈4,600 kPa. This increase in back-pressure took place in the concentration interval where a previous study (Jiang, W.; Irgum, K. Anal. Chem., 1999, 71, 333–344) showed that the sulfopropylbetaine groups have their maximum uptake of HClO$_4$. A significant back-pressure increase that cannot be explained by a salt-induced viscosity change of the eluent was also seen during gradient elution from 0–1 M NaCl in 10mM phosphate buffer. This increased flow resistance in the presence of salts can be explained by the viscous drag experienced by the eluent as the grafted chains extend into the flow paths. Measurements were then made of the ζ-potentials of native silica and silica modified with zwitterionic groups by grafting and dynamic equilibration, cf. Table 4.

TABLE 4

ζ-potentials of silicas modified with zwitterionic groups by grafting and dynamic coating.

| Material[1] | HCl | HNO$_3$ | HClO$_4$ | NaCl | NaNO$_3$ | NaClO$_4$ |
|---|---|---|---|---|---|---|
| | 2 mM | 2 mM | 2 mM | 2 mM | 2 mM | 2 mM |
| KS | 3.6 ± 1.1 | 4.5 + 2.9 | 2.3 ± 1.6 | −12.6 ± 0.3 | −11.4 ± 7.3 | −13.6 ± 2.5 |
| KS-TC-TBHP-SPE | 1.0 ± 0.4 | 0.9 ± 2.3 | −8.1 ± 0.6 | −15.4 ± 3.9 | −13.7 ± 7.0 | −25.4 ± 6.0 |
| Nucleosil-ODS-SB12 | −13.4 ± 0.4 | −16.5 ± 0.5 | −44.2 ± 0.9 | −17.5 ± 1.1 | −34.5 ± 1.0 | −37.6 ± 1.3 |
| | 20 mM | 20 mM | 20 mM | 20 mM | 20 mM | 20 mM |
| KS | 2.9 ± 0.3 | 2.3 ± 0.5 | 0.2 + 0.2 | −6.8 ± 4.0 | −4.4 ± 2.0 | −5.5 ± 2.3 |
| KS-TC-TBHP-SPE | −6.4 ± 0.5 | −9.8 ± 2.5 | −16.0 ± 1.3 | −8.3 ± 2.4 | −10.9 ± 1.4 | −12.2 ± 2.7 |

TABLE 4-continued

ζ-potentials of silicas modified with zwitterionic groups by grafting and dynamic coating.

| Material[1] | HCl | HNO$_3$ | HClO$_4$ | NaCl | NaNO$_3$ | NaClO$_4$ |
|---|---|---|---|---|---|---|
| Nucleosil-ODS-SB12 | −12.2 ± 0.6 | −22.5 ± 0.4 | −39.3 ± 0.3 | −11.6 ± 0.3 | −25.0 ± 0.5 | −49.7 ± 1.1 |

[1]KS, Kromasil silica;
KS-TC-TBHP-SPE: KS grafted with zwitterionic polymer chains;
Nucleosil-ODS-SB12, Nucleosil C$_{18}$ coated with SB12.

The bare silica had a surface potential close to zero in the tested acids at both concentration levels, and the type of anion had little effect. Its ζ-potential became slightly negative in neutral solution (salt only) and there were no discernible potential differences for sodium salts with different anions. When comparing the ζ-potentials measured in 2 and 20 mM salt solutions, it was found the ζ-potential increased at the higher concentration level, which is expected due to suppression of the double layer.

For the SPE grafted silica, the ζ-potential in both acids and salts of three different anions showed the same general trend. At the lower concentration level tested, there was no difference between the ζ-potentials in HCl and HNO$_3$, nor between NaCl and NaNO$_3$. However, with HClO$_4$ and NaClO$_4$, the ζ-potentials were more negative than with the two other acids and salts, respectively. The same anion-dependent pattern was apparent at the higher concentration, although the ζ-potentials became lower in the acids and higher in the salt solutions, i.e., the surface charge density increased with an increasing acid concentration and decreased with an increasing concentrations of neutral salts. Overall, the ζ-potentials of the SPE-grafted silica were of substantially lower magnitude than those of the Nucleosil C$_{18}$ that had been coated with a sulfoalkyl-betaine detergent. This reveals that the grafted material had a substantially lower surface charge density, in spite of the thickness of the grafted layer evident from the elemental analysis data in Table 1 and the increase in back-pressure seen at the high concentration levels of perchloric acid and sodium perchlorate in Table 3. A lower surface charge density is expected when the grafted chains expand as a result of increasing acid or salt concentration, due to "dilution" of the net charge in the extended layer (Jimbo, T.; Tanioka, A. ; Minoura, N. J. Colloid Interfac. Sci. 1998, 204, 336–341; Uchida, E. ; Uyama, Y. ; Ikada, Y. Langmuir 1994, 10, 1193–1198.). For sodium perchlorate this was observed as a lower absolute value for the ζ-potential, but for perchloric acid the ζ-potential magnitude doubled as the acid concentration was increased from 2 to 20 nM. There is no explanation for this behaviour at present. A polymer-based sulfoalkylbetaine material reported on earlier (Jiang, W.; Irgum, K. Anal. Chem., 1999, 71, 333–344) had a much higher affinity for perchloric acid than for sodium perchlorate.

As mentioned, the changes in ζ-potentials of the Nucleosil-ODS-SB12 material were considerably larger than than those seen with the grafted material. At both the concentration levels tested there was a trend towards more negative potential with anion type in the series Cl$^-$<NO$_3^-$<ClO$_4^-$, indicating that the association of the more chaotropic anions was more pronounced than on the grafted material. This can again be an effect of the high density of the zwitterionic groups in the absorbed layer on the Nucleosil-ODS-SB12 compared to the charge density expressed by the comparatively sparse layer of SPE chains grafted on the bare silica.

EXAMPLE 2

Synthesis of the KS-DIOL-SPE and KS-SPE Zwitterionic Stationary Phase.

15 g Kromasil porous silica (5 μm, 200 Å) was covered with toluene and vacuum suction was applied at 60° C. using occasional stirring until toluene was distilled off. A 50 mL solution containing 5% glycidoxypropyltrimetoxysilane in toluene was added to the particles and allowed to react for 12 hours at room temperature. The particles were washed carefully with acetone followed by methanol and water. The particles were then immersed into 100 mL 0.1 M HCl and stirred at 60° C. for 3 hours. After filtering the particles and removing the acid with distilled water, the particles were washed with acetone, and dried using vaccum suction. The material was denoted KS-DIOL-SPE.

A solution containing 15 g SPE monomer dissolved in 100 mL Milli-Q water was added to the particles. This slurry was sonicated for 10 minutes followed by purging with helium for 10 minutes. A solution containing 0.3 g cerium ammonium nitrate dissolved in 80 mL Milli-Q water was prepared and purged with helium. The particle slurry was added to a reactor wherafter the cerium ammonium nitrate solution was added. Reaction was allowed to take place for 24 hours at 60° C. and 155 rpm. The product was thereafter filtered off using a porous glass filter and washed with large amounts of 0.5 M NaCl, water, methanol and acetone, respectively.

In another experiment 20 g Kromasil porous silica (5 um, 200 Å) was covered with 100 mL 0.1 M HCl and stirred at room temperature for 2 hours. After filtering the particles and removing the acid with distilled water and dried using vaccum suction. A solution of 15 g SPE monomer dissolved in 100 mL Milli-Q water was added to 15 g of the particles. A solution containing 0.3 g cerium ammonium nitrate dissolved in 80 mL Milli-Q water was prepared and purged with helium. The 15 g particle slurry was added to a reactor wherafter the cerium ammonium nitrate solution was added. Reaction was allowed to take place for 24 hours at 60° C. and 155 rpm. The material was denoted KS-SPE.

A blank experiment without initiator was performed. A solution of 5 g SPE monomer dissolved in 60 mL Milli-Q water was added to 5 g of the remaining particles. Heating was allowed to take place for 24 hours at 60° C. and 155 rpm. The product was thereafter filtered off using a porous glass filter and washed with large amounts of 0.5 M NaCl, water, methanol and acetone, respectively.

Elemental analysis of the resulting particles shows a sulfur and nitrogen content corresponding well to the result in Example 1. The experiment carried out without cerium ammonium nitrate resulted in particles having very low amounts of sulfur and nitrogen (0.04 and 0.3%, respectively). The characteristics of the KS-SPE zwitterionic stationary phase were found to be approximately the same as for KS-TC-TBHP-SPE.

EXAMPLE 3

Column Packing and Chromatographic Evaluation.

The silica particles with zwitterionic stationary functional groups were slurry packed into 150 mm long by 4 mm i.d. poly(ether-ether-ketone) (PEEK) column blanks from Upchurch Scientific (Oak Harbor, Wash.), using Milli-Q water as packing solvent. The packing was accomplished with a high flow pump of the pneumatic amplifier type (Knauer, Berlin, Germany) using a final hydraulic pressure of 60 MPa.

The chromatographic system used for evaluating the protein separation consisted of an SP 8700XR gradient LC pump, an AS3000 autosampler with a 20 μl stainless steel injection loop, and a UV 150 UV spectrophotometric detector (all from Spectra-Physics). In the evaluation of small inorganic ions, the detector was replaced by an LDC (Laboratory Data Control, Riviera Beach, Fla.) Conducto-Monitor electrolytic conductivity detector with a Conductocell 7011. All chromatograms were recorded on a Star workstation (Varian, Palo Alto, Calif.). The chromatographic evaluations were carried out at room temperature (22±° C.).

EXAMPLE 4

Effect of Mobile Phase Concentration on the Separation of Inorganic Anions and Cations.

Figure 1:
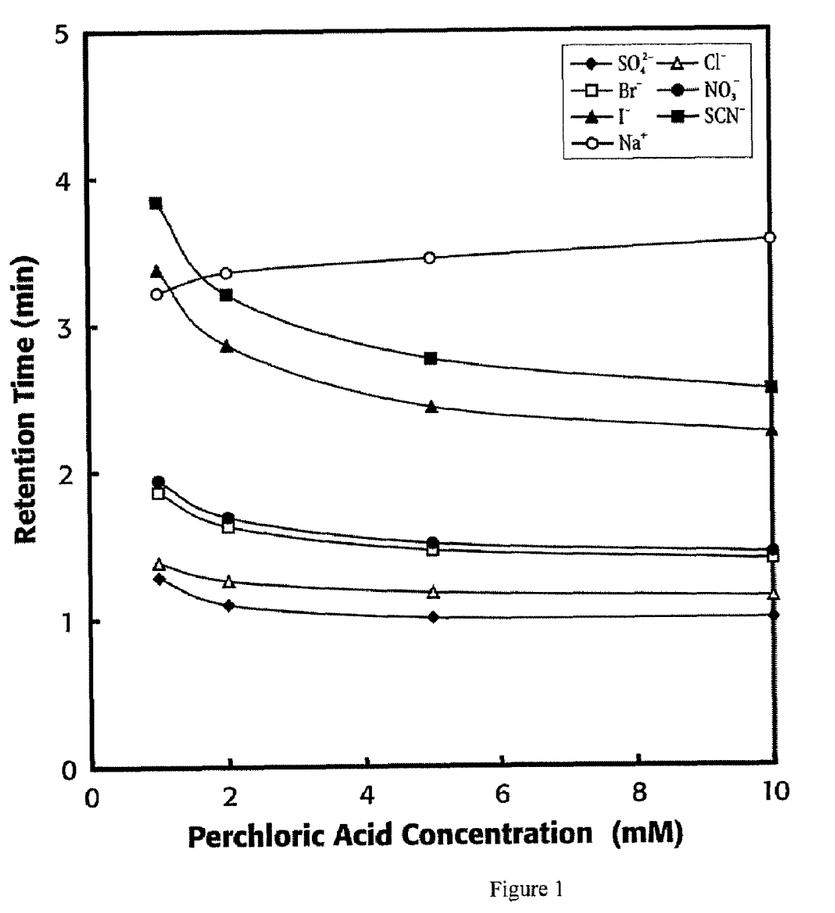
FIG. 1 discloses the effect of perchloric acid concentration on the retention time of inorganic anions and cations on the KS-TC-TBHP-SPE column with aqueous perchloric acid as eluent at 1 mL/min. Direct conductivity detection was used in all experiments.

The salts $Na_2SO_4$, NaCl, NaBr, $NaNO_3$, NaI, NaSCN were injected individually at 1 mM concentration on the packed column, using perchloric acid as eluent at concentrations ranging from 1 to 10 mM. The general tendency was that the retention times of all anions decreased with increasing perchloric acid concentration, whereas the retention dependence of the sodium ion was the opposite; FIG. 1. This retention pattern is similar to those we have observed for materials of good charge balance in previous studies of surface modified and grafted zwitterstationary phases based on polymeric substrates, most notably the surface modified material termed S300-TC-DMA-PS. That material shares with the current silica-based grafted material a low overall retention for anions, with an eluent concentration dependence that does not reflect the conventional stoichiometric ion exchange retention model for ions on fixed charge ion exchangers, i.e., log(k') vs. log[eluent concentration] does not describe a linear relationship with a slope whose absolute value is equal to the quotient of the charges of the eluite ion and the counter-ion involved in the elution process. Elemental analyses revealed that a capacity of 0.76 mmole/g was reached, which is lower than the capacities attained on polymeric substrates. The retentiveness of the silica-based covalently bonded zwitterionic exchanger was also lower than any of the materials reported earlier, and considerably lower than conventional, singly charged ion exchangers of similar functional group density.

EXAMPLE 5

Simultaneous Separation of Inorganic Anions and Cations.

Figure 2:
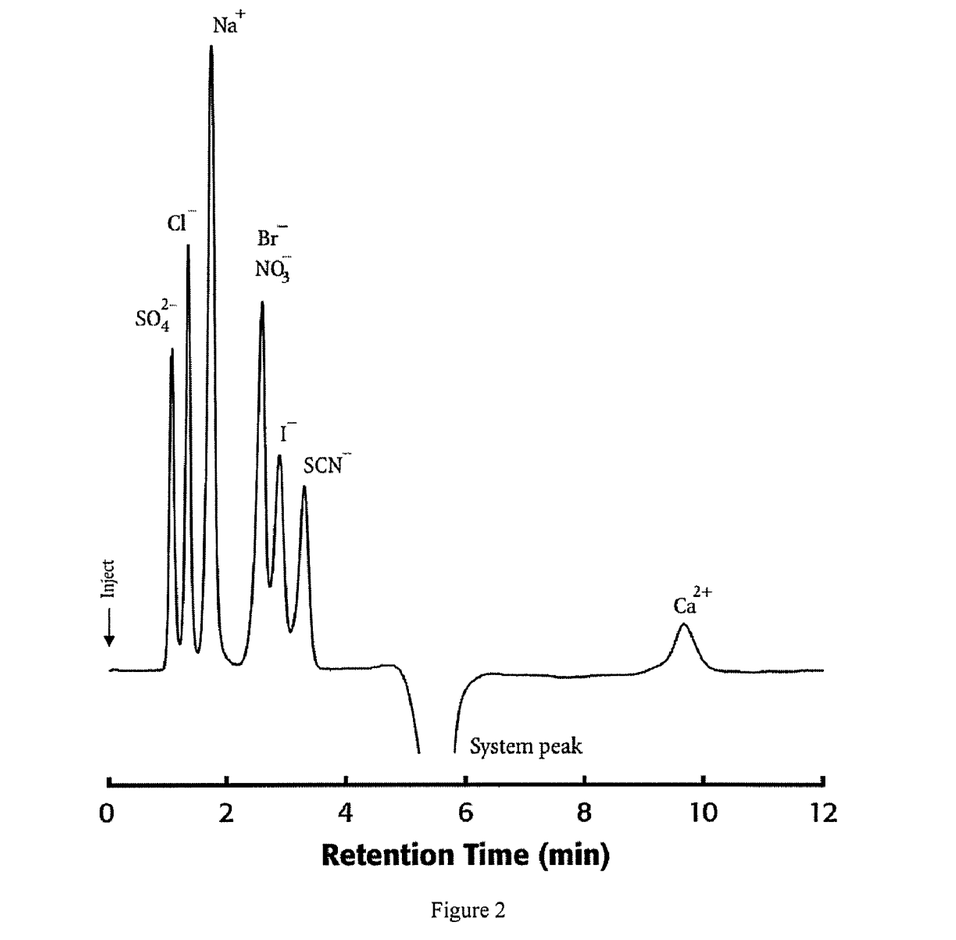
FIG. 2 presents chromatogram from the separation of a mixture containing 1CaSO$_4$, CaCl$_2$, Ca(NO$_3$)$_2$ and 2NaBr, NaI, and NaSCN on the KS-TC-TBHP-SPE column, using 5magnesium perchlorate at a flow rate of 1 mL/min as eluent. Direct conductivity detection was used in the experiment.

In order to compare the chromatographic properties of the new silica-based grafted zwitterionic material with the polymeric materials published in our previous papers, a mixture with several different inorganic anions and cations was prepared and injected on the column. It was found that cations and anions could be simultaneously separated based on their individual properties, using eluents based magnesium perchlorate, as shown in FIG. 2. Perchloric acid was also used as the eluent to separate the same mixture as above, but $Ca^{2+}$ and $Mg^{2+}$ could not be eluted within 30 min. This should be because the sulfonic groups strongly retain the divalent cations and the eluent was not strong enough to elute them in a reasonable time. As mentioned in previous studies (Jiang, W.; Irgum, K. Anal. Chem., 2001, 73, 1993–2003), the magnesium ions enhance the retention of anions due to its interaction with the sulfonic group of the zwitterionic group, causing a lower negative charge on the material. Furthermore, since magnesium is a strong counterion, it can elute $Ca^{2+}$ from the column in a reasonable time. However, a problem with the present material is that nitrate and bromide ions overlap in the chromatograms when magnesium perchlorate is used as eluent.

EXAMPLE 6

Effect of pH on the Separation of Acidic and Basic Proteins with Gradient Elution.

Figure 3:
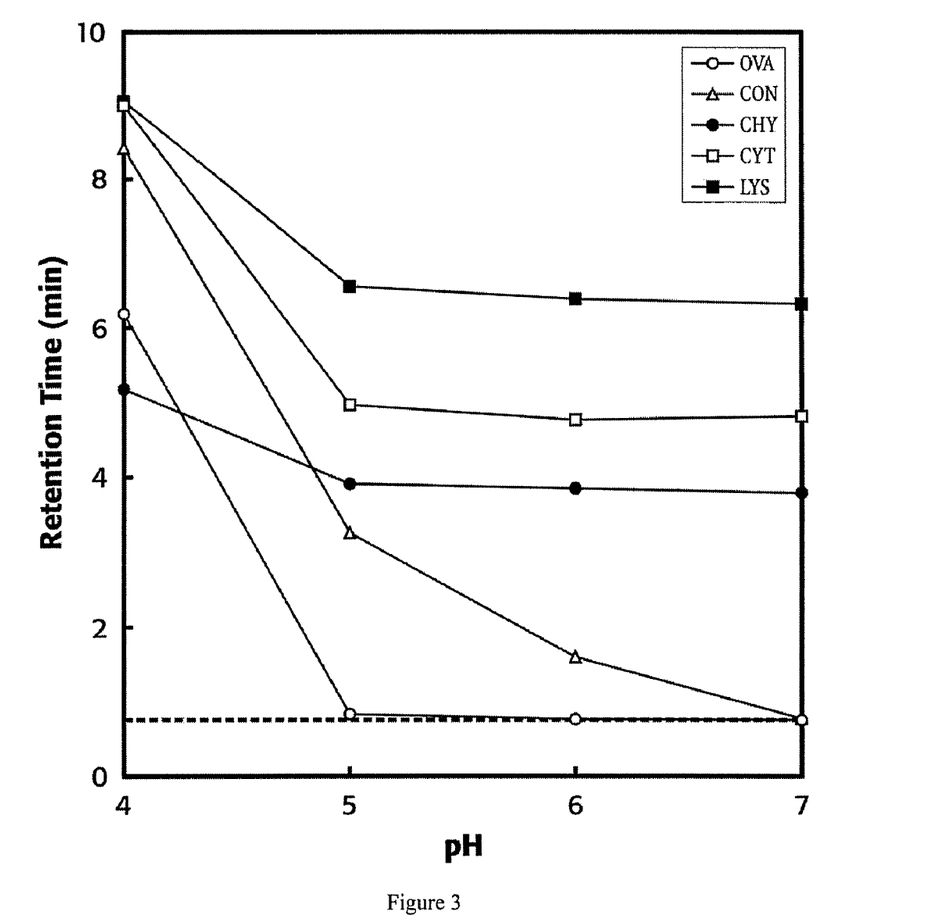
FIG. 3 shows the effect of pH on the retention of proteins on the KS-TC-TBHP-SPE column. The proteins were injected as a mixture in water containing 2 mg/ml of ovalbumin (OVA), α-chymotrypsinogen A (CHY), cytochrome C (CYT) and lysozyme (LYS), and 4of conalbumin (CON). Elution was accomplished by a gradient from 100% A to 100% B in 15 min at a flow rate of 1 Eluent A: 10 mM phosphate buffer at the pH indicated; Eluent B: 10 mM phosphate buffer plus 1 M NaCl. The dashed horizontal line corresponds to the dead time in the chromatographic system.

In addition to the separation of small inorganic ions, the grafted silica can also be used for the separation of proteins. FIG. 3 shows the effect of pH on the retention times of ovalbumin (4.7 (Kopaciewicz, W.; Rounds, M. A.; Fausnaugh, J.; Regnier, F. E. J. Chromatogr. 1983, 266, 3-21.); 4.9 (Beeley, J. A.; Stevenson, S. M. ; Beeley, J. G. Biochim. Biophys. Acta 1972, 285, 293-300.)), conalbumin (6.0, 6.3, 6.6 (Kopaciewicz, W.; Rounds, M. A.; Fausnaugh, J. ; Regnier, F. E. J. Chromatogr. 1983, 266, 3-21.)), α-chymotrypsinogen A (8.8, 9.2, 9.6; (Kopaciewicz, W.; Rounds, M. A. ; Fausnaugh, J. ; Regnier, F. E. J. Chromatogr. 1983, 266, 3-21.)9.1 (Han, J. H.; Lee, C. H. Colloid. Surface. B 1997, 9, 131–137.)), cytochrome C (9.0, 9.4, (Kopaciewicz, W.; Rounds, M. A.; Fausnaugh, J.; Regnier, F. E. J. Chromatogr. 1983, 266, 3-21.)), and lysozyme (11; (Kopaciewicz, W.; Rounds, M. A. ; Fausnaugh, J. ; Regnier, F. E. J. Chromatogr. 1983, 266, 3-21.) 10.7 (Beeley, J. A.; Stevenson, S. M. ; Beeley, J. G. Biochim. Biophys. Acta 1972, 285, 293–300.)) (pI literature values in parentheses), the protein probes used in this study. It can be seen that the retention times of these proteins decreased with increasing pH of the buffer solution. Ovalbumin and conalbumin lacked retention at pH above 5 and 7, respectively. As the ζ-potential kept almost unchanged in four tested pH range, we therefore attribute this to dissociation of acidic groups on the protein surface, which induces a more negative charge as the eluent pH is increased. Since the cation exchange properties are prevailing due to the distal position of the sulfonic acid moiety in the sulfopropylbetaine group, the retention will disappear as the protein alters its overall charge from positive to negative.

EXAMPLE 7

Simultaneous Separation of Acidic and Basic Proteins.

Figure 4:
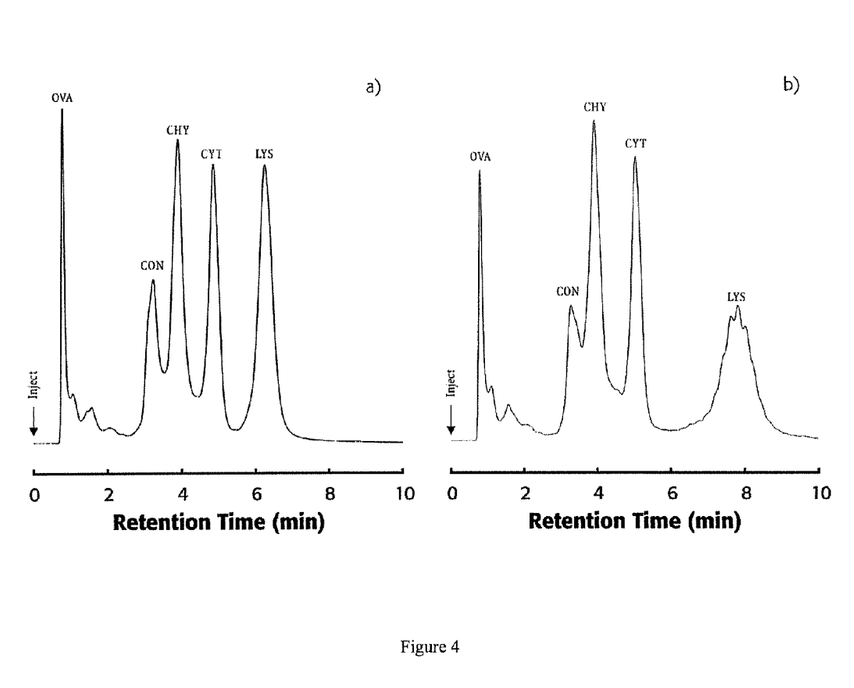
FIG. 4 indicates chromatograms of a mixture of proteins with a composition identical to that used in FIG. 3. Gradient elution: From 100% A to 100% B in 15 min at a flow rate of 1 ml/min, starting at the time of injection. Eluent A: 10 mM, pH 5.3 phosphate buffer; a) Eluent B: 10 mM, pH 5.3 phosphate buffer plus 1 M NaCl; b) Eluent B: 10 mM, pH 5.3 phosphate buffer plus 1 M NaCl and 0.1 M NaClO$_4$.

A simultaneous separation of acidic and basic proteins was attempted, using gradient elution from 10 mM phosphate buffer, pH 5.3 to the same buffer containing salt. Two different salt buffers were used as the stronger eluent; one containing 1 NaCl, and the other 1 NaCl and 0.1NaClO$_4$. Typical chromatograms are shown in Figure O-valbumin eluted in the void volume with both gradient eluents due to the low pi of the protein and a negative surface charge of zwitterionic stationary phase. When FIGS. 4a and 4b are compared, it can be seen that the retention times for conalbumin, chymotrypA, cytochrome C, and lysozyme all increased when perchlorate ion was added to the stronger eluent. In accordance with previous studies (Jiang, W.; Irgum, K. Anal. Chem., 1999, 71, 333–344; Jiang, W.; Irgum, K. Anal. Chem., 2001, 73, 1993–2003., Viklund, C.; Irgum, K. Macromolecules 2000, 33, 2539–2544; Viklund, C.; Irgum, K. Anal. Chem., 2001, 73, 444–452., Iso, K.; Okada, T. Langmuir 2000, 16, 9199–9204.), the chaotropic perchlorate ion interacts preferentially with the quaternary ammonium group, thus inducing a more negative surface potential on the zwitterionic material. Although the observed ζ-potential decrease (Table 2) was less pronounced than those of the organic polymer based materials described earlier, the addition of perchlorate ions still affected the ion exchange character of the zwitterionic phase an effect manifest in retention time increases in buffers containing perchlorate ion. Modulation of the tenacity of the zwitterionic stationary phase by addition of perchlorate ions is thus possible also on the present separation medium, based on graft polymerized zwitterionic chains on silica instead of copolymerised (Viklund, C.; Irgum, K. Macromolecules 2000, 33, 2539–2544) or post-polymerization modified (Viklund, C.; Irgum, K. Anal. Chem., 2001, 73, 444–452.) polymeric zwitterionic sorbents.

EXAMPLE 8

Separation on a Zwitterionic Stationary Phase in Hydrophilic Interaction Mode.

The porous silica having covalently bound zwitterionc groups constitutes a highly hydrophilic chromatographic stationary phase independent of pH due to the equivalent presence of both a strong anion exchange and a strong cation exchange group. It was therefore examined in hydrophilic interaction liquid chromatography mode.

Figure 5:
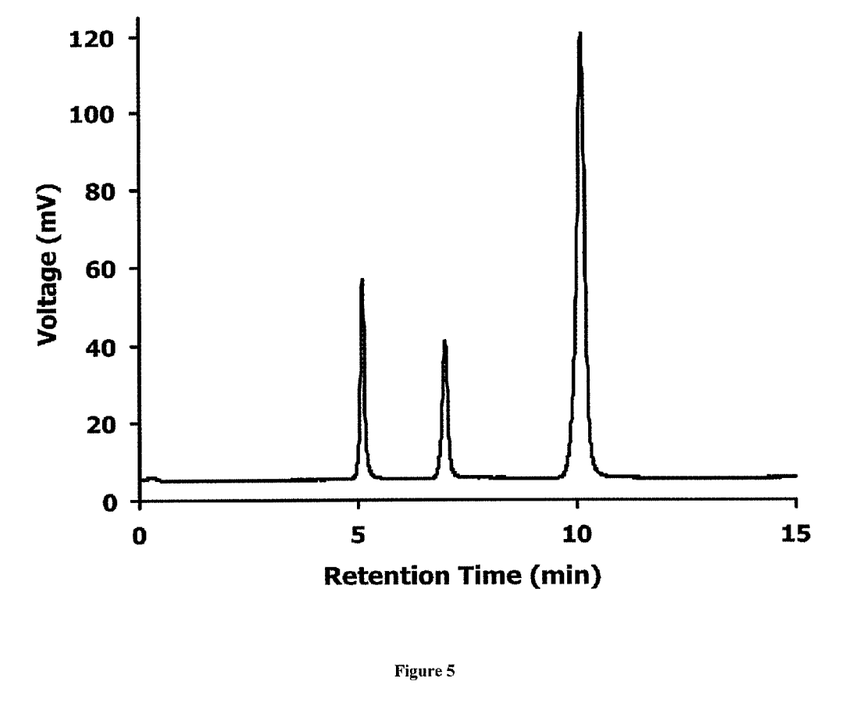
FIG. 5 shows a chromatogram of a mixture containing 1 mg/ml melatonin, uracil, and cytosine dissolved in mobile phase and injected on a 250 mm by 4.6 mm i.d. column packed with the zwitterionic phase KS-DIOL-SPE. The mobile phase contained 75% (v/v) acetonitrile and 25% (v/v) 5 mM ammonium acetate buffer pumped through the column at a flow rate of 0.5 mL/min.

A PEEK column 250 mm long by 4.6 mm i.d. was packed with the zwitterionic phase KS-DIOL-SPE and it was evaluated in the chromatographic system using a mobile phase containing 75% (v/v) acetonitrile and 25% (v/v) 5 mM ammonium acetate buffer pumped through the column at a flow rate of 0.5 mL/min. A 5 μL sample containing melatonin, uracil, and cytosine diluted in mobile phase was injected on the column. All compounds were separated and both uracil and cytosine had retention on the zwitterionic column, see FIG. 5. Uracil is a commonly used and recommended marker for the void volume on non-polar reversed phase columns meaning that it has no retention in that mode. This clearly illustrates that the zwitterionic material is suitable as stationary phase for hydrophilic interaction liquid chromatography separations.

EXAMPLE 9

HILIC Separation on the KS-SPE Zwitterionic Stationary Phase.

Figure 6:
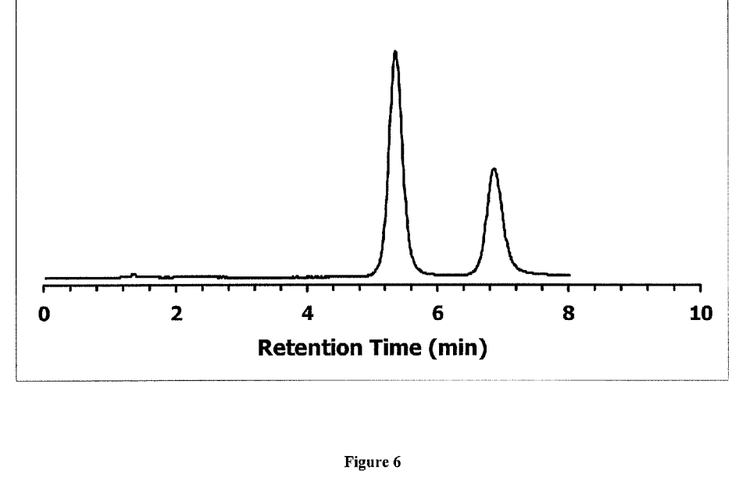
FIG. 6 shows a chromatogram of a mixture containing uridine monophosphate (UMP) and uridine diphosphate (UDP) dissolved in mobile phase and injected on a 100 mm long by 4.6 mm column packed with the zwitterionic phase KS-SPE. The mobile phase contained 70% (v/v) acetonitrile and 30% (v/v) 30 mM ammonium acetate buffer (pH 5.4) pumped through the column at a flow rate of 0.7 mL/min.

A PEEK column 100 mm long by 4.6 mm i.d. was packed with the KS-SPE zwitterionic phase and it was evaluated in a chromatographic system using a mobile phase containing 70% (v/v) acetonitrile and 30% (v/v) 30ammonium acetate buffer (pH 5.4) pumped through the column at a flow rate of 0.7 mL/min. A 5 μL sample containing uridine monophosphate (UMP) and uridine diphosphate (UDP), diluted in mobile phase was injected on the column. The compounds were separated and both UMP (peak 1) and UDP (peak 2) had retention on the zwitterionic column, see FIG. 6. This clearly illustrates that the zwitterionic material is suitable as stationary phase for hydrophilic interaction liquid chromatography separations of highly polar and charged compounds.

EXAMPLE 10

The Synthesis of KS-TC-TBHP-SPV Zwitterionic Separation Material.

The Kromasil silica particles were activated to achieve peroxide initiating groups by the same method as in Example 1. Subsequently, 2 grams of peroxide-functionalized silica were added to a three-necked reaction flask, and mixed with a monomer solution of 2.5 grams of SPV monomer in 7.5ml HPLC grade methanol and 30 ml of milliQ water. The mixture was then degassed with nitrogen gas for 30 minutes before the polymerization. The graft polymerization was carried out at 80° C. for 7 hours under slow stirring in a thermostat. After the polymerization, the suspension solution was mixed with approximately 500 ml of 1 M sodium chloride, ultrasonicated for 10 minutes. It was decanted and resuspended in 1 M aquqous sodium chloride and sonicated for 15 minutes. After sonication, the particles were allowed to settle, and the decanting/resuspension procedure was repeated a total of three times.

The final product clearly showed hydrophilic properties and the incorporation of functionality was confirmed by elemental analysis; N 0.12% (n=3), S 0.22% (n=3), %S$_{E.A.}$/%S$_{cal}$ 0.8 compared to blank values; N 0.03% (n=3) and S<0.1 (n=3, below detection limit).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A porous silica particle for use in zwitterionic and hydrophilic interaction high performance liquid chromatography, comprising zwitterionic groups that have been graft-polymerized on the particle.

2. A silica particle according to claim 1, wherein zwitterionic groups are polymerized to said zwitterionic groups grafted on the particle; and the number of zwitterionic groups polymerized to said zwitterionic groups grafted on the particle is greater than the number of said zwitterionic groups grafted on the particle.

3. A silica particle according to claim 1, wherein said zwitterionic groups contain polymeric chains of at least two zwitterionic monomers.

4. A silica particle according to claim 3, wherein said polymeric chains are built up of a zwitterionic monomer selected from the group consisting of 3-[N, N-dimethyl-N-(methacryloyloxyethyl)ammonium] propanesulfonate, 1-(3-sulfopropyl)-2-vinylpyridinium betaine, and 3-[N, N-dimethyl-N-(methacrylamidopropyl)amrnonium] propanesulfonate.

5. A column packing material suitable for use as a stationary phase in zwitterionic and hydrophilic interaction high performance liquid chromatography, comprising the porous silica particle according to claim 1.

6. A column packing material according to claim 5, wherein zwitterionic groups are polymerized to said zwitterionic groups grafted on said porous silica particle; and
the number of zwitterionic groups polymerized to said zwitterionic groups grafted on said porous silica particle is greater than the number of said zwitterionic groups grafted on said porous silica particle.

7. A column packing material according to claim 5, wherein said zwitterionic groups comprise polymeric chains of at least two zwitterionic monomers.

8. A column packing material according to claim 7, wherein said polymeric chains are built up of a zwitterionic monomer selected from the group consisting of 3-[N,N-dimethyl-N-(methacryloyloxyethyl)ammonium] propanesulfonate, 1-(3-sulfopropyl)-2-vinylpyridinium betaine, and 3-[N, N-dimethyl-N-(methacrylamidopropyl)ammonium] propanesulfonate.

9. A method for producing porous silica particles for zwitterionic and hydrophilic interaction high performance liquid chromatography according to claim 1, comprising:
providing porous silica particles suitable for use in zwitterionic and hydrophilic interaction high performance liquid chromatography;
reacting said silica particles with thionyl chloride, thereby obtaining activated silica particles;
reacting said activated silica particles with a tert-(C4–C10)-alkyl hydroperoxide to couple said tert-(C4–C10)-alkyl hydroperoxide to said activated silica particles, thereby obtaining peroxide-functionalized silica particles; and
adding a zwitterionic methacryloxyethyl monomer to said peroxide-functionalized silica particles, thereby initiating graft polymerization of said zwitterionic methacryloxyethyl monomer to said peroxide-functionalized silica particles, wherein the porous silica particles comprise covalently bound zwitterionic groups.

10. A method according to claim 9, wherein the zwitterionic methacryloxyethyl monomer is 3-[N,N-dimethyl-N-(methacryloyloxyethyl)ammonium] propanesulfonate.

11. A method for producing porous silica particles for zwitterionic and hydrophilic interaction high performance liquid chromatography, comprising:
providing porous silica particles suitable for use in zwitterionic and hydrophiuic interaction high performance liquid chromatography;
suspending the silica particles in an aqueous solution of a zwitterionic methacryloxyethyl monomer, thereby obtaining a suspension of silica particles; allowing said suspension to equilibrate at room temperature;
heating said equilibrated suspension to a temperature at or between 40° C. and 70° C.; and
adding an aqueous solution of ammonium cerium nitrate, thereby initiating graft-polymerization, wherein
the porous silica particles comprise graft-polymerized zwitterionic groups.

12. A method according to claim 11, wherein the zwitterionic methacryloxyethyl monomer is 3-[N, N-dimethyl-N-(methacryloyloxyethyl)ammonium] propanesulfonate.

\* \* \* \* \*